US006267352B1

(12) United States Patent
Semeyn, Jr. et al.

(10) Patent No.: US 6,267,352 B1
(45) Date of Patent: Jul. 31, 2001

(54) ELECTRONIC THROTTLE RETURN MECHANISM WITH DEFAULT AND GEAR BACKLASH CONTROL

(75) Inventors: Mark Warner Semeyn, Jr., Ypsilanti; Edward Albert Bos, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/438,576

(22) Filed: Nov. 11, 1999

(51) Int. Cl.[7] .......................... F16K 31/02; F16K 31/44; F16K 1/00; F16K 5/00; F02M 3/00

(52) U.S. Cl. ................................ 251/129.12; 251/250.5; 251/305; 251/129.02; 251/313; 123/339.15

(58) Field of Search ........................... 251/129.12, 250.5, 251/305, 88, 288, 129.02, 286, 287, 313; 123/339.15, 361, 337

(56) References Cited

U.S. PATENT DOCUMENTS 1,558,222 * 10/1925 Beetow .
2,924,424 2/1960 Tittering .
3,359,819 * 12/1967 Veillette et al. ........................ 74/409
3,924,596 12/1975 Klemm .
4,008,877 2/1977 Yasuoka .
4,601,271 7/1986 Ejiri et al. .
4,827,884 5/1989 Cook .
4,838,226 6/1989 Matsuzawa .
4,848,505 7/1989 Yoshizawa .
4,873,954 10/1989 Codling .
4,879,657 11/1989 Tamura et al. .
4,892,071 1/1990 Asayama .
4,947,815 8/1990 Peter .
4,951,772 * 8/1990 Peter et al. ........................... 123/361
4,961,355 10/1990 Irino .
4,986,238 1/1991 Terazawa .
4,991,552 2/1991 Luft et al. .
5,014,666 5/1991 Westenberger .
5,018,496 5/1991 Buchl .
5,038,733 8/1991 Westenberger .
5,056,613 10/1991 Porter .
5,078,110 1/1992 Rodefeld .
5,103,787 4/1992 Bassler et al. .
5,113,822 5/1992 Asayama .
5,148,790 9/1992 Hickman et al. .
5,161,508 11/1992 Zentgraf et al. .
5,168,852 12/1992 Moriguchi .
5,168,951 12/1992 Sugiura .
5,259,349 11/1993 Radinski .
5,265,572 11/1993 Kadomukai .
5,275,375 1/1994 Semence .
5,297,521 3/1994 Sasaki .
5,297,522 3/1994 Buchl .
5,325,832 7/1994 Maute .
5,423,299 6/1995 Kumagai .
5,429,090 7/1995 Kotchi .
5,429,097 7/1995 Wojts-Saary et al. .
5,630,571 5/1997 Kipp .
5,752,484 5/1998 Apel .
5,775,292 7/1998 Seeger .
5,984,260 * 11/1999 Rawson et al. .................. 251/129.12
6,095,448 * 8/2000 Semeyn, Jr. et al. ........... 251/129.12

FOREIGN PATENT DOCUMENTS 0 574 093 6/1991 (EP) .
2217 389 10/1989 (GB) .
2 233 038 1/1991 (GB) .

* cited by examiner

*Primary Examiner*—Kevin Shaver
*Assistant Examiner*—David A. Bonderer
(74) *Attorney, Agent, or Firm*—Jerome R. Drouillard

(57) ABSTRACT

An electronic throttle control system having a housing 22 with a motor 40, throttle valve 60, gear mechanism 100, and failsafe mechanism 130. A main spring member 150 positioned between the housing 22 and a gear mechanism 104, which in turn is attached to the throttle valve shaft 62, biases the throttle plate 60 towards the closed position. A spring-biased gear backlash sector gear mechanism 130 biases the throttle plate 60 from its closed position to a default or "limp-home" position.

13 Claims, 5 Drawing Sheets

ELECTRONIC THROTTLE RETURN MECHANISM WITH DEFAULT AND GEAR BACKLASH CONTROL

CROSS-REFERENCE TO RELATED APPLICATIONS

The present application is related to the following three patent applications which are co-owned by the same assignee and filed on the same date herewith: "Electronic Throttle Return Mechanism With A Two-Spring and Two-Lever Default Mechanism," Ser. No. 09/438,161 (199-0419); "Electronic Throttle Control System With Two-Spring Failsafe Mechanism," Ser. No. 09/438,122 (199-0418); and "Electronic Throttle Return Mechanism With a Two-Spring and One Lever Default Mechanism," Ser. No. 09/438,162 (199-0421). The disclosures of each of these three other patent applications are hereby incorporated by reference herein.

TECHNICAL FIELD

This invention relates to electronic valve control systems and more particularly to an electronic throttle control system for an internal combustion engine.

BACKGROUND

Valve assemblies for engines and related systems typically utilize rotatable valve members in fluid flow passageways to assist in regulating fluid flow through them. For example, throttle valve members are positioned in the air induction passageways into internal combustion engines. The valve assemblies are controlled either mechanically or electronically and utilize a mechanism which directly operates the valve member.

For electronic throttle control systems, it is desirable to have a failsafe mechanism or system which activates the throttle valve in the event that the electronic control or electronic system of the vehicle fails. There are known electronic throttle control systems which have failsafe mechanisms for closing the throttle valve or moving it to a slightly open position in the event of an electronic failure in the vehicle. Some of these mechanisms utilize one, two or more spring members in order to activate the failsafe system.

It would be desirable to have an electronic valve control system with an improved failsafe or limp-home mechanism and which provides an improved assembly and system with reduced cost and improved reliability.

SUMMARY OF THE INVENTION

The present invention provides an electronic throttle control assembly having a housing with a motor, a gear train and throttle valve. A throttle plate is positioned on a throttle shaft and the plate and shaft are positioned in the engine or air induction passageway, such that the throttle plate regulates airflow into the engine.

The operation of the throttle valve is accomplished by a gear train assembly driven by a reversible DC motor. The motor is regulated by the electronic control unit of the vehicle which in turn is responsive to the input of the vehicle operator or driver. A throttle position sensor is included in a housing cover and feeds back the position of the throttle plate to the electronic control unit.

In the operation of the throttle valve, a gear connected to the motor operates an intermediate gear, which in turn operates a two-piece sector gear which is connected to the throttle body shaft. The two portions of the sector gear are biased by sector gear spring members such that the gear teeth on the two portions are biased to non-mating or mating positions. A main helical spring member biases the sector gear and attached throttle shaft and valve toward the throttle closed position. In the event of an electronic failure during operation of the vehicle with the throttle valve open, the main spring member will return the throttle valve to the closed position.

If the throttle valve is in its closed position when an electronic failure occurs, the sector gear spring members act on the two sector gear portions to rotate one portion slightly relative to the other and in turn cause the throttle valve slightly to a failsafe position. The forces of the sector gear spring members in the sector gear are greater than that of the main spring member. At the failsafe position, the vehicle can still be operated, although at a reduced capacity. This allows the driver to "limp-home."

Other features and advantages of the present invention will become apparent from the following description of the invention, particularly when viewed in accordance with the accompanying drawings and appended claims.

DESCRIPTION OF THE PREFERRED EMBODIMENT(S)

Figure 1:
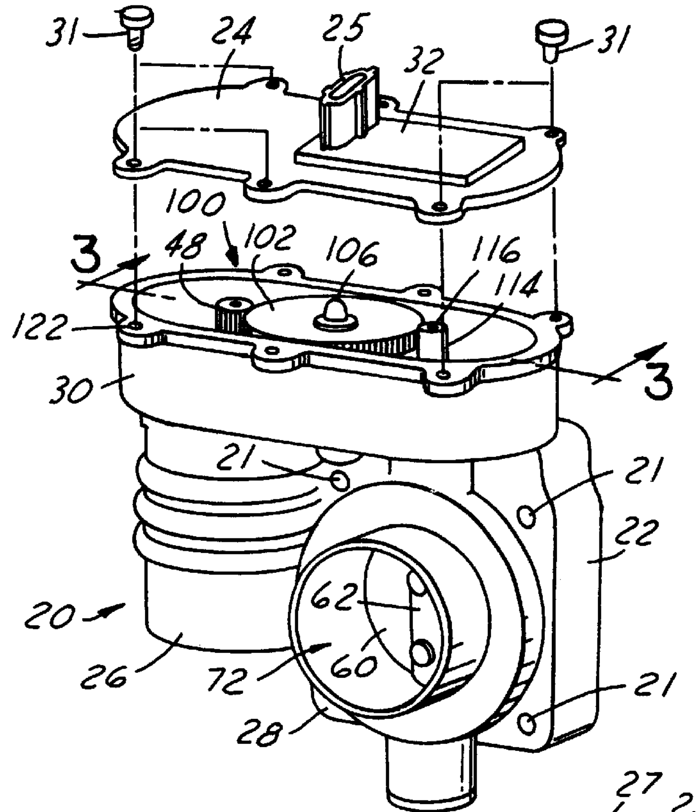
FIG. 1 illustrates an electronic throttle control assembly in accordance with the present invention.
Figure 3:
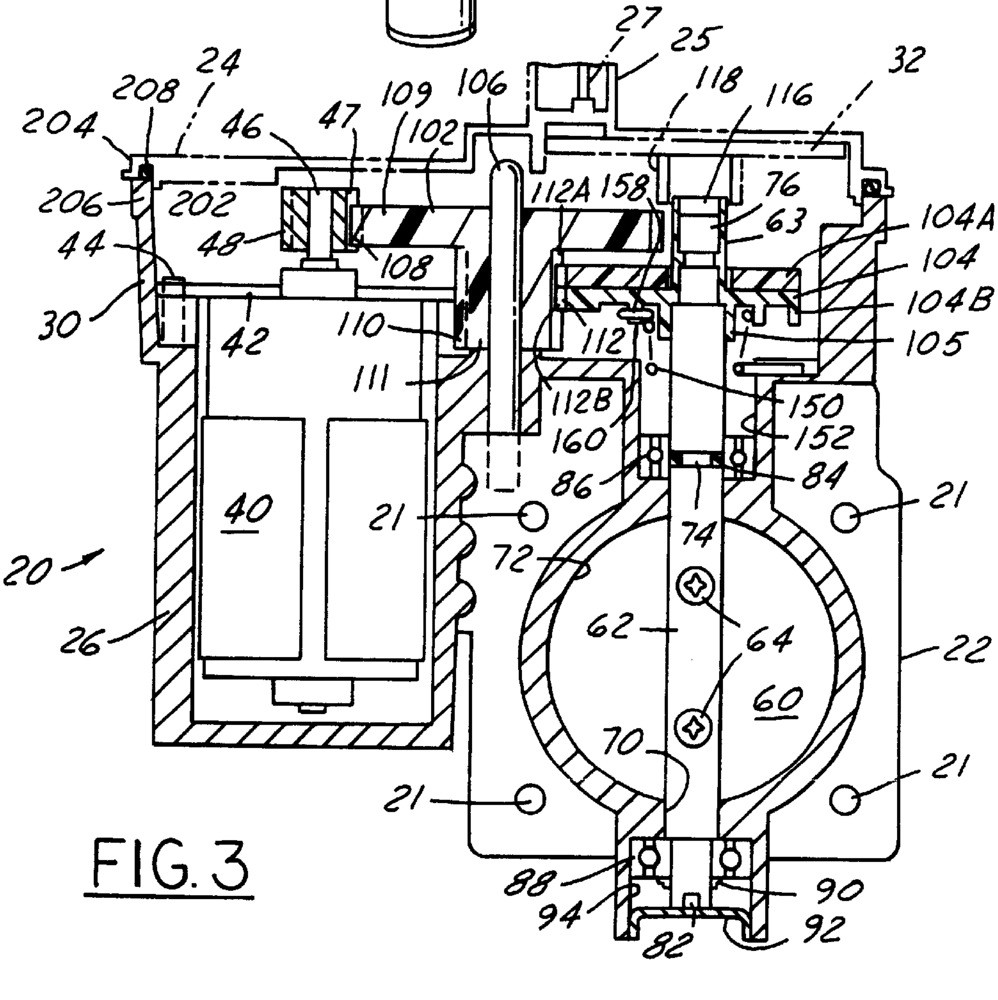
FIG. 3 is a cross-sectional view of the electronic throttle control assembly of FIG. 1, the cross-section being taken along line 3—3 in FIG. 1 and in the direction of the arrows.
Figures 2, 6:
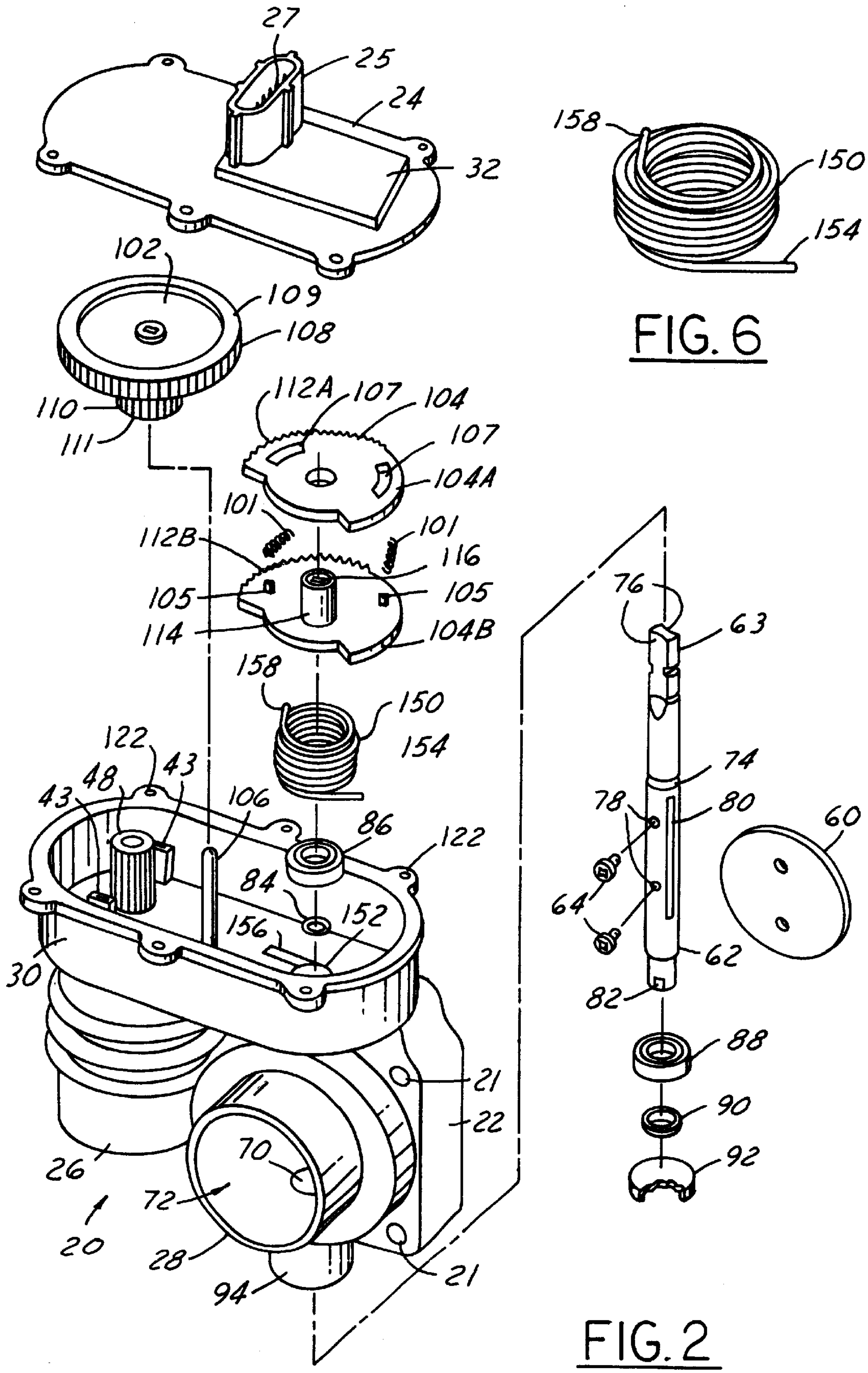
FIG. 2 is an exploded view of the electronic throttle control assembly of FIG. 1.
FIG. 6 illustrates an embodiment of a main spring member which can be utilized with the present invention.
Figure 4:
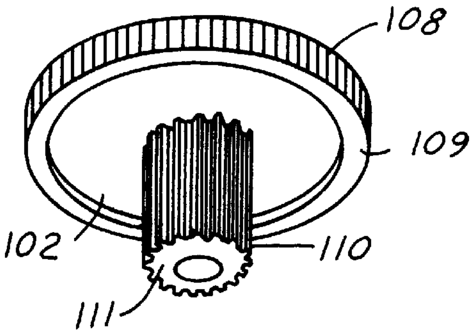
FIG. 4 depicts an intermediate gear member which can be utilized with the present invention.

FIGS. 1–3 illustrate a preferred embodiment of an electronic throttle control assembly in accordance with the present invention, while FIGS. 4–12 illustrate various components of the assembly and the operation thereof. As to FIGS. 1–3, FIG. 1 illustrates the assembly 20 in its assembled form (with the cover removed for clarity), FIG. 2 illustrates the components of the assembly in an exploded condition, and FIG. 3 is a cross-sectional view of the assembly 20 as shown in FIG. 1.

The electronic throttle control assembly 20 includes a housing or body member 22 and a cover member 24. The housing 22 includes a motor section 26, a throttle valve section 28, and a gear train section 30. The cover member 24 includes the throttle position sensor (TPS) 32, together with related electronics, which reads or "senses" the position of the throttle valve and transmits it to the electronic control unit (ECU) 200 of the vehicle (see FIG. 10). In order to connect the ECU to the TPS, an electrical connector member 25 is positioned on the cover member 24. The connector member preferably has six contacts 27: two to the motor 40 which regulates the position of the throttle valve; and four to the TPS and related electronics.

When the driver or operator of the vehicle presses the vehicle accelerator, the electronic control unit (ECU) sends a signal to the motor 40 which in turn operates the gear train 100 and adjusts the position of the throttle valve 60. The throttle valve is positioned in the main air passageway 72 from the air intake inside the engine compartment to the internal combustion engine. The precise position of the throttle valve in the airflow passageway is sensed by the TPS and relayed or fed back to the ECU in order to confirm or adjust the desired throttle valve setting. The throttle valve thus regulates the airflow to the internal combustion engine and in turn the speed of the engine and velocity of the vehicle.

The cover member can be attached to the body member 22 in any conventional manner, but preferably is connected by a plurality of fastener members, such as screws or bolts 31. For this purpose, a series of openings 120 are provided in the cover member for mating with a series of sockets 122 on the gear section 30 of the housing 22. The sockets 122 can be threaded in order to securely hold the cover in place or threaded nuts could be utilized. Also, an appropriate gasket or sealing member 208 can be positioned between the cover member and the housing in order to protect the gear train and TPS from dirt, moisture and other environmental conditions (see FIG. 3). When the electronic throttle control assembly 20 is utilized, it is positioned in the engine compartment of the vehicle and bolted or otherwise securely fastened to the vehicle. For this purpose, a plurality of holes 21 are provided in the housing.

The motor 40, as best shown in FIG. 3, is preferably a reversible thirteen volt DC motor although other conventional comparable motors can be utilized. The motor 40 is connected to a mounting plate 42 which is bolted or otherwise securely fastened to the body member 22 by a plurality of bolts, screws, or other fasteners 44. The plate 42 also has a pair of contacts 43, as shown in FIG. 2, which electrically connect the electronics in the cover member 24 to the motor 40.

The motor 40 has a shaft 46 on which a small spur gear 48 is positioned. The gear 48 has a plurality of teeth 47 which mesh with and rotate adjacent gears, as described below. The throttle valve or plate 60 is secured to a throttle body shaft 62 which in turn is positioned in the throttle section 28 of the body member or housing 22. The throttle plate 60 is secured to the throttle body shaft 62 by a plurality of small fasteners or plate screws 64. The throttle shaft 62 is positioned in a bore or channel 70 in the throttle section of the body member 22. The bore 70 is transverse to the axis of the air flow passageway 72.

Throttle shaft 62 has an O-ring channel or groove 74, a pair of flats or recesses 76 at the upper end for connection to one of the gears (as explained below), a pair of openings 78 for positioning of the plate screws therethrough, an axial or longitudinally extending slot 80 for positioning of the throttle plate 60 therein, and a pair of flats or recesses 82 at the lower end for use in assembling and positioning the throttle valve. The flats 82 are utilized to rotate the throttle shaft 62 during assembly of the throttle plate and also for orientation of the sector gear during the molding or attachment process.

An O-ring 84 is positioned in the channel 74 on the throttle shaft. The O-ring 84 provides a seal between the air in the air flow passageway 72 and the gear train components and electronics in the cover. For assembly of the throttle body shaft and throttle plate in the assembly 20, the throttle body shaft 62 is first positioned in the bore 70 and rotated in order to allow the plate 60 to be positioned in slot 80. The throttle body shaft 62 is then turned approximately 90 degrees n order to allow the throttle plate screws 64 to be secured through the shaft and plate, thereby securely affixing the plate to the shaft.

When the throttle body shaft 62 is positioned in the housing 22, a pair of bearings 86 and 88 are provided to allow the throttle body shaft to rotate freely in the housing. The bearings 86 and 88 are conventional ball-bearing members with pairs of races separated by small balls.

As shown in FIG. 3, once the throttle body shaft 62 is positioned in the body member 22 (and before the throttle plate 60 is secured to it), an axial retainer clip member 90, preferably made of a spring steel material, is secured to the lower end of the shaft. The retainer clip member 90 holds the throttle body shaft 62 securely in position in the throttle section 28 of the body or housing member 22 and minimizes axial or longitudinal movement (or "play") of the shaft 62 in the housing.

During assembly, the clip member 90 is pushed or forced onto the shaft 62 until it contacts the inner race of bearing 88. The throttle body shaft, being stepped in diameter, is then fixed axially to the inner race of the bearing. A spring clip member could also be utilized in order to pre-load the bearings to minimize radial movement of the shaft and also minimize axial movement of the shaft in the assembly 22.

Once the retainer clip member 90 is installed in position and the throttle plate is attached to it, an end cap member or plug member 92 is positioned enclosing the cavity 94. This protects the lower end of the shaft from moisture, dirt and other environmental conditions which might adversely affect the operation of the throttle valve. This step is typically the last step in the assembly process since the end of the shaft 62 is left exposed until after all end-of-the-line testing has been completed.

As shown in FIG. 3, the cover member 24 preferably has a ridge member 202 positioned on one side adjacent to the outer edge 204. The ridge member is adopted to hold the gasket or sealing member 208 in place and to mate with the upper edge 206 of the housing 22. Also, a rigid bushing can be positioned in one or more of the mating openings 120 in the cover member 24 and/or sockets 122 in the housing 22. The bushing member will prevent overtightening of fasteners 31 and help insure that the TPS 32 in the cover member is accurately spaced relative to the magnet 116 in central member 114 of the sector gear 104.

Figure 5:
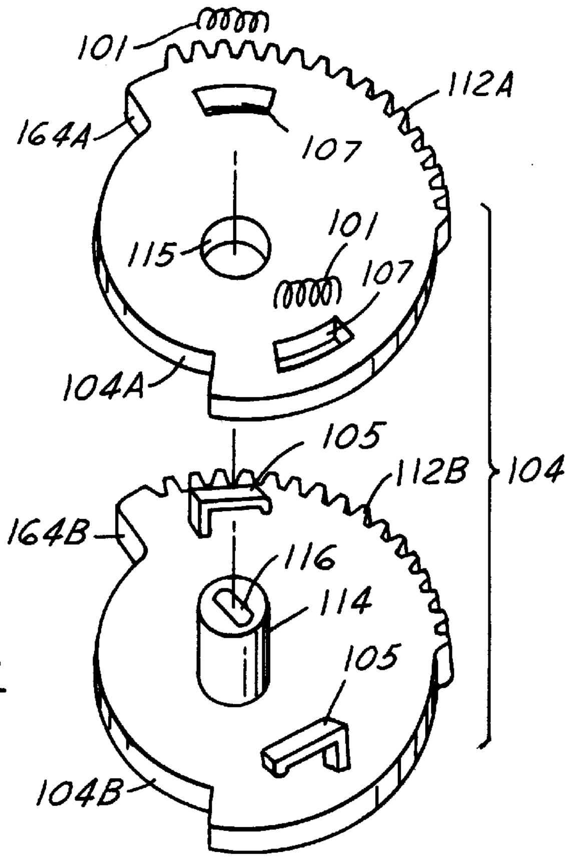
FIG. 5 illustrates a two piece sector gear member which can be utilized with the present invention.

The gear assembly or gear train mechanism used with the electronic control assembly 20 in accordance with the present invention is generally referred to by the reference numeral 100. The gear train mechanism 100 includes spur gear 48 attached to motor 40, an intermediate gear member 102 (FIG. 4), and a two piece or two-portion sector gear member 104 (FIG. 5). The intermediate gear member 102 is mounted on a shaft member 106 which is secured to the housing or body member 22 (see FIGS. 1–3). The intermediate gear member 102 rotates freely on shaft 106.

The intermediate gear member 102 has a first series of gear teeth 108 on a first portion 109 and a second series of gear teeth 110 on a second portion 111. The gear teeth 108 on gear 102 are positioned to mesh with the gear teeth 47 on the motor driven gear 48, while the gear teeth 110 are positioned and adapted for mating with the gear teeth 112 on the sector gear 104. As shown in the drawings, the teeth 112 on gear 104 are only provided on a portion or sector of the outside circumference of the gear member.

All of the gear members 48, 102 and 104 are preferably made of a plastic material, such as nylon, although they can be made of any other comparable material, or metal, which has equivalent durability and function.

The sector gear 104 is made of two portions 104A and 104B which are connected together by two or more L-shaped holder members 105 on portion 104B which fit within mating slots 107 in portion 104A and are biased by small coil spring members 101. Relative rotational movement of sector gear portions 104A and 104B is biased and influenced by the force of spring members 101.

The sector gear portion 104B is preferably molded onto the end 63 of the throttle body shaft 62. For this purpose, recesses 76 are provided on the shaft 62 to allow the sector gear portion 104B to be integrally molded to the shaft and be permanently affixed thereto. Also, the lower end 105 of the sector gear portion 104B can be extended in order to contact the inner race of bearing 86, thus helping to hold the throttle body shaft axially in position.

The sector gear portion 104B has a central portion or member 114 which extends above the gear train 100 for communication with the throttle position sensor (TPS) mechanism 32 in the cover member 24. The central portion 114 extends freely through opening 115 in sector gear portion 104A. In order for the TPS to read the position of the throttle valve plate 60, the TPS must be able to correctly sense or read the movement and rotation of the throttle body shaft 62.

For this purpose, two opposing flats are positioned on the upper end of the central member 114. The hub of the TPS is press-fit onto these flats and thus the position of the throttle shaft can be read accurately without relative movement between the TPS and the shaft.

Figure 10:
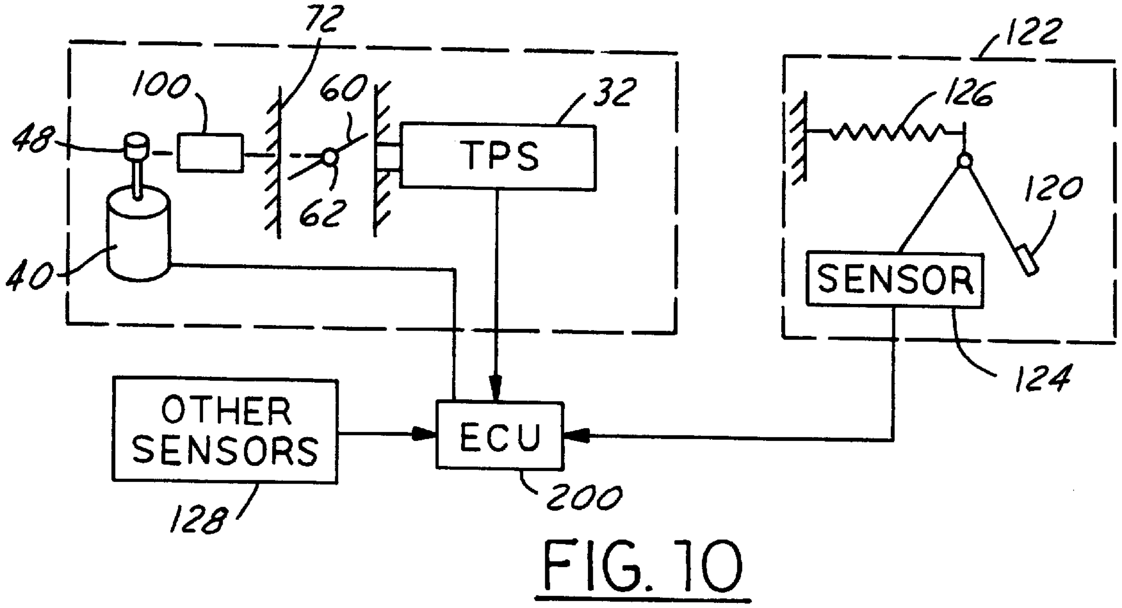
FIG. 10 is a schematic illustration showing a representative circuit which can be utilized with the present invention.
Figure 11:
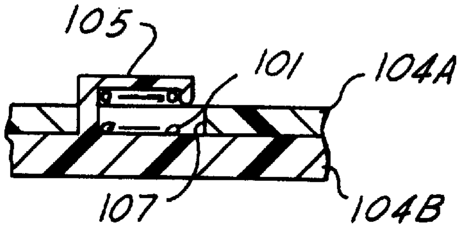
FIGS. 11 and 12 illustrate features of the two-piece sector gear member in accordance with an embodiment of the invention, with FIG. 11 being a partial cross-sectional view taken along line 11—11 in FIG. 7.
Figure 12:
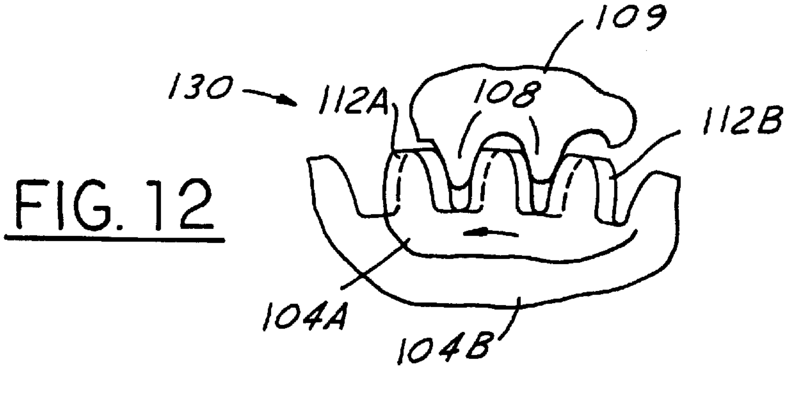

In the operation of the electronic throttle valve assembly, the force applied to the accelerator pedal 120 by the operator of the vehicle 122 is read by a sensor 124 and conveyed to the ECU 200 (see FIG. 10). The accelerator pedal 120 is typically biased by a spring-type biasing member 126 in order to provide tactile feedback to the operator. The ECU of the vehicle also receives input from a plurality of other sensors 128 connected in other mechanisms and systems in the vehicle.

In order to operate the throttle valve plate 62, a signal from the ECU 200 is sent to the motor 40. The motor rotates the spur gear 48 which then operates the gear train mechanism 100. More specifically, the gear member 48 rotates the intermediate gear member 102, which in turn rotates the sector gear member 104. This in turn causes the throttle body shaft 62, which is fixedly attached to the sector gear portion 104B, to rotate. Rotation of shaft 62 accurately positions the valve plate 62 in the passageway 72 and allows the requisite and necessary air flow into the engine in response to movement of the accelerator pedal 120.

The present invention also has a default or failsafe (a/k/a "limp-home") mechanism which allows the throttle valve plate to remain partially open in the event of a failure of the electronics system in the throttle control mechanism or in the entire vehicle. For the "failsafe" mechanism of the present electronic throttle control assembly 20, the two piece sector gear 104 with a gear backlash mechanism 130 is provided.

The two sector gear portion 104A and 104B are held together by the L-shaped holder members 105 and coil spring members 101. Each of the two portions 104A and 104B have gear teeth portions 112A and 112B, thereon respectively, which combine to form gear teeth 112 on sector gear assembly 104. When the gear teeth 112 are driven by gear teeth 108 on intermediate gear member 102, the two gear teeth portions 112A and 112B are in axial alignment and act together to rotate sector gear portion 104A and 104B in unison.

The spring-biased two-portion sector gear backlash mechanism 130, in combination with the sector gear portions 104A and 104B and the main spring member 150 (described below), act together to limit and control the operation of the valve plate member 60 and the failsafe mechanism.

A helical torsion spring member 150 is positioned in recess or pocket 152 in the housing 22. The main spring member 150 is positioned around the valve shaft member 62 as shown in FIG. 3 and acts to bias the sector gear 104 (and thus the valve or throttle plate member 60) relative to the housing 22. For this purpose, one end 154 of the main spring member is fixedly positioned (or grounded) in slot 156 in the housing and the other end 158 of the spring member is bent and held by flange 160 on the bottom of sector gear portion 104B (see FIG. 3).

Figure 7:
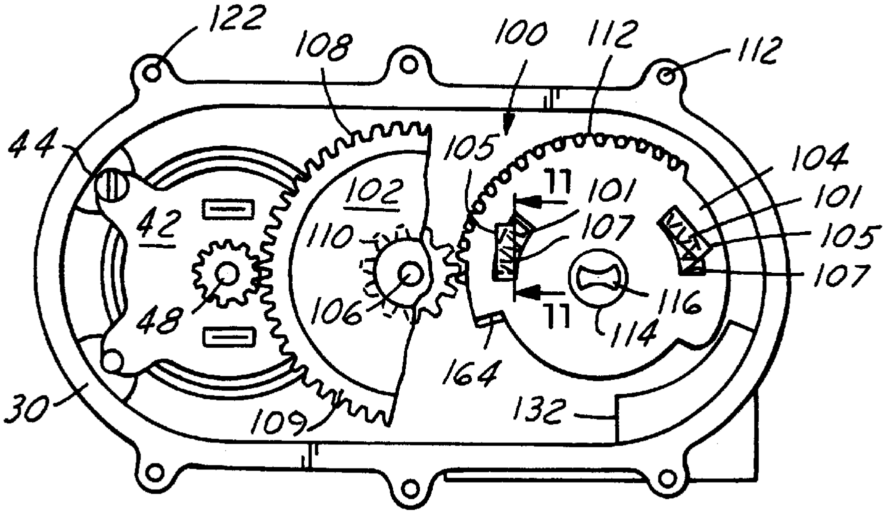
FIGS. 7, 8, and 9 illustrate the range of operation of the gear train in accordance with one embodiment of the present invention.
Figure 7A:
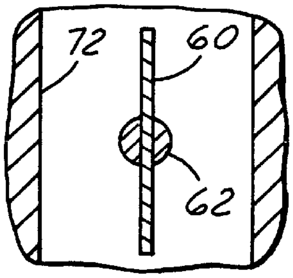
FIGS. 7A, 8A and 9A illustrate various positions of the throttle valve plate during the range of operation of the present invention.

When installed and assembled, the main spring member 150 biases the valve plate member 60 towards its closed position. Thus, when the shaft member 62 and sector gear 104 are rotated by the motor 40 and gear train mechanism 100 to the fully open position of the throttle plate 60, as shown in FIGS. 7 and 7A, the main spring member 150 is biased to return the valve or throttle plate member 60 to or towards the closed position. In the fully open position, the throttle plate 60 is positioned approximately parallel with the axis of the passageway 72 thus allowing a full compliment of air to pass into the engine. In the event of an electronic failure in the throttle control assembly 20 when the throttle valve is open (i.e., when the accelerator pedal is depressed and the vehicle is moving at a significant velocity), the failsafe mechanism will automatically act to close the throttle valve in order to reduce the speed of the engine and the velocity of the vehicle.

The gear backlash mechanism 130 prevents the throttle valve from closing completely in the event of an electrical failure. The backlash mechanism 130 acts to rotate the throttle valve to a slightly open position, thus allowing the vehicle to operate at a reduced speed and "limp-home." For this purpose, the sector gear member 104 has a stop shoulder 164 thereon which mates with stop member 132 on the housing 30. The stop shoulder 164 is comprised of stop shoulder portion 164A on sector gear portion 104A and stop shoulder portion 164B on sector gear portion 104B. When the stop shoulder portions 164A and 164B meet with stop member 132 on the housing, the throttle valve is in its completely closed position and neither the sector gear 104 or throttle valve can rotate any further. At this point, the force of the two spring members 101 acting between the sector gear portions 104A and 104B act to rotate the sector gear portion 104B (and thus the throttle valve shaft and plate member) slightly back in the direction towards the open position—i.e. to a failsafe or limp home position.

Further details of the construction, structure and operation a two-portion gear backlash mechanism is explained in more detail in U.S. Pat. No. 5,056,613, the disclosure of which is hereby incorporated by reference herein.

Figure 8:
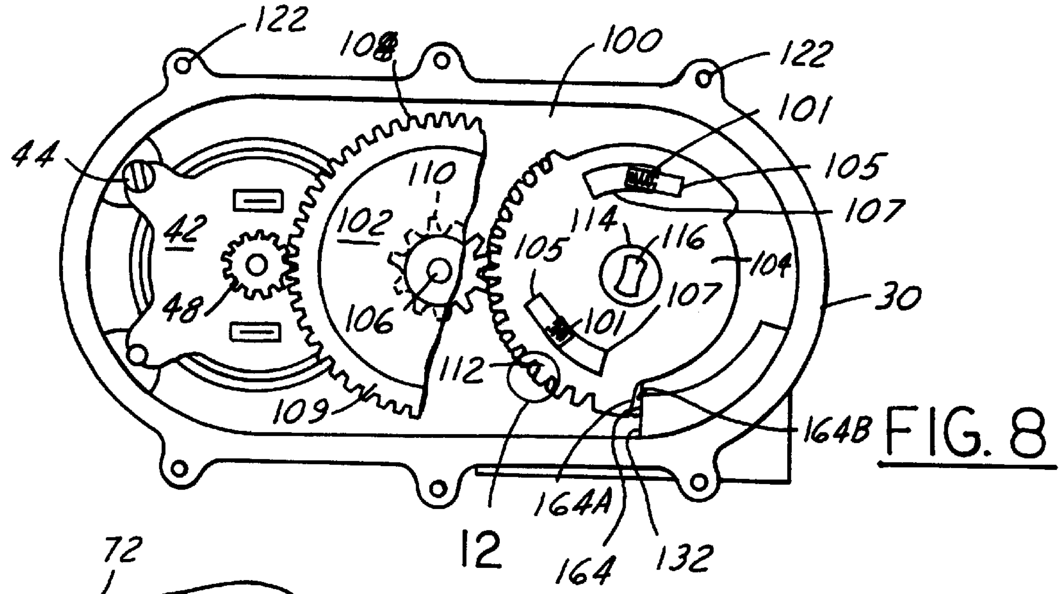
Figure 8A:
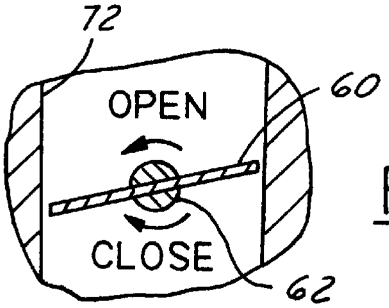

The position of the gear mechanism 100 at this point of operation is shown in FIG. 8. The resultant default or "limp-home" position of the throttle plate member 60 is shown in FIG. 8A. When the valve or throttle plate member is in the default position, it is opened about 5°–10° from the throttle valve's closed position.

In many engines known today, the throttle plate is manufactured and assembled to have a slight inclination on the order of 7°–10° in the fully closed position. This is to assure proper functioning of the valve plate in all conditions and prevent it from sticking or binding in the closed position. Thus, in the default or "limp-home" position, the throttle plate will be about 12°–20° from a position transverse to the axis of the air flow passageway.

Figure 9:
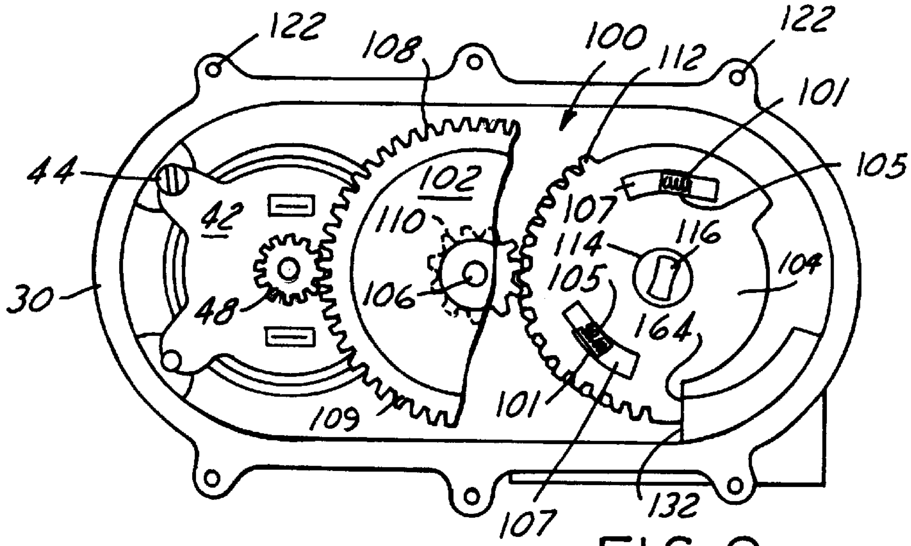
Figure 9A:
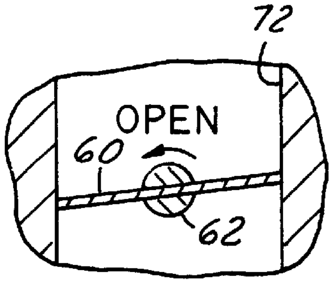

In order to overcome the force of the gear backlash spring members 101 and allow the throttle plate member to be moved to its fully closed position, the motor 40 is operated. The motor, through the gear train mechanism 100 turns or rotates the sector gear portion 104B which in turn rotates the throttle shaft and closes the valve plate member 60. The motor forces the entire shoulder 164 (formed of portions 164A and 164B) against the stop member 132. The position of the sector gear 104 at this point in operation is shown in FIG. 9. The corresponding fully closed position of the throttle plate member 60 is shown in FIG. 9A.

In the event of an electronic failure in the throttle control assembly 20 when the throttle plate member is closed or almost closed, the failsafe mechanism will automatically act to open the throttle plate to the default or "limp-home" position. The force of the spring members 101 acting on sector gear portion 104B on the sector gear member 104 will rotate sector gear portion 104B slightly relative to sector gear portion 104A which in turn will rotate the throttle shaft and throttle plate member 60 sufficiently in order to open the throttle valve to a limited extent (to the default position).

In the failsafe position of operation, the throttle plate 60 is at a slightly opened position, as shown in FIG. 8A. In such a position, the throttle valve allows some air to flow through the passageway 72, thus allowing the engine sufficient inlet air in order to operate the engine and for the vehicle to "limp-home". With the use of two spring mechanisms (main spring member 150 and backlash spring members 101), the throttle shaft member 62 (and thus the throttle valve plate member 60) is biased in all directions of operation of the throttle control valve system toward the default or limp-home position.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A valve assembly comprising:

a housing;

a fluid passageway in said housing;

a shaft member rotatably positioned in said housing and extending through said fluid passageway;

a valve member positioned in said fluid passageway, said valve member attached to said shaft member and rotatable therewith;

a gear mechanism for rotating said shaft member between a first position in which said valve member is oriented to allow full passage of fluid in said passageway, and a second position in which said valve member is oriented to prevent fluid passage in said passageway;

a motor member operably connected to said gear mechanism for causing said gear mechanism to rotate said shaft member;

a main spring member for biasing said gear mechanism and shaft member in a direction away from said first position and toward said second position; and a spring-biased gear backlash sector gear mechanism for biasing said shaft member in a direction away from said second position and to a third default position between said first and second positions;

wherein in the event of non-operation of said motor member, said spring-biased gear backlash sector gear mechanism acts to position said shaft member in said third position.

2. The valve assembly of claim 1 further comprising electronic means for operating said motor member.

3. The valve assembly of claim 2 further comprising a cover member on said housing, at least a portion of said electronic means being positioned in said cover member.

4. The valve assembly of claim 1 wherein said gear mechanism comprises at least a first gear member connected to said motor and a second gear member attached to said shaft member.

5. The valve assembly of claim 4 further comprising a third gear member positioned between said first and second gear members.

6. The valve assembly of claim 4 wherein said main spring member is biased between said second gear member and said housing.

7. The valve assembly of claim 6 wherein said main spring member is a helical torsion spring member.

8. The valve assembly of claim 4 further comprising a stop member on said second gear member, said stop member positioned to limit rotation of said gear mechanism and thus said shaft member.

9. The valve assembly of claim 1 wherein said spring-biased gear backlash sector gear mechanism comprises a first sector gear portion, a second gear portion, and spring biasing means positioned between said first and second sector gear portions and rotatably biasing said first and second sector gear portions relative to one another.

10. An electronic throttle control assembly comprising:

a housing;

an air passageway in said housing;

a throttle shaft member rotatably positioned in said housing and extending through said air passageway;

a throttle plate member attached to said throttle body shaft and positioned in said air passageway;

said throttle plate member rotatably between a first position preventing air from passing through said air passageway and a second position allowing a full compliment of air to pass through said air passageway;

a motor positioned in said housing having a rotatable motor shaft;

a gear assembly positioned in said housing, said gear assembly comprising at least a first gear member attached to said motor shaft and a second gear member attached to said throttle shaft member;

wherein operation of said motor rotates said throttle plate between said first position and said second position;

a first spring member positioned between said housing and said second gear member, said first spring member biasing said throttle shaft member away from said second position and toward said first position;

default means positioned in said housing, said default means comprising a spring-biased gear backlash mechanism;

said spring-biased gear backlash mechanism biasing rotation of said throttle body shaft toward a third position of said throttle plate between said first and second positions;

wherein in the event of failure of said motor, said throttle plate will be rotated to said third position and allow limited passage of air through said air passageway.

11. The throttle control assembly of claim 10 further comprising a third gear member operably positioned between said first and second gear members.

12. The throttle control assembly of claim 10 further comprising a stop member on said second gear member, said stop member positioned to contact a mating second stop member on said housing.

13. The throttle control assembly of claim 10 wherein said spring-biased gear backlash mechanism comprises a first gear portion, a second gear portion and a spring biasing means positioned between and rotatably biasing said first and second gear portions.

* * * * *